US009483932B2

(12) United States Patent
Amis

(10) Patent No.: US 9,483,932 B2
(45) Date of Patent: Nov. 1, 2016

(54) SYSTEMS AND METHODS FOR A SAFETY STATUS INDICATOR SYSTEM

(71) Applicant: David Amis, Cedar Park, TX (US)

(72) Inventor: David Amis, Cedar Park, TX (US)

( * ) Notice: Subject to any disclaimer, the term of this patent is extended or adjusted under 35 U.S.C. 154(b) by 228 days.

(21) Appl. No.: 13/963,651

(22) Filed: Aug. 9, 2013

(65) Prior Publication Data

US 2015/0042467 A1 Feb. 12, 2015

(51) Int. Cl.
| G08B 25/00 | (2006.01) |
| G08B 27/00 | (2006.01) |
| G01S 19/16 | (2010.01) |
| G01S 19/17 | (2010.01) |
| G08B 25/01 | (2006.01) |

(52) U.S. Cl.
CPC .............. *G08B 27/00* (2013.01); *G01S 19/16* (2013.01); *G01S 19/17* (2013.01); *G08B 25/016* (2013.01)

(58) Field of Classification Search
CPC .... G08B 25/00; G08B 25/016; G08B 27/00; G08B 27/001; H04W 4/21; H04W 4/22; H04W 4/025
See application file for complete search history.

(56) References Cited

U.S. PATENT DOCUMENTS

| 2011/0117878 | A1* | 5/2011 | Barash | G08B 21/0211 455/404.2 |
| 2013/0007501 | A1* | 1/2013 | Areal | G06Q 10/20 714/2 |
| 2013/0183924 | A1* | 7/2013 | Saigh | H04W 4/025 455/404.2 |
| 2016/0119424 | A1* | 4/2016 | Kane | G08B 27/001 709/203 |

\* cited by examiner

*Primary Examiner* — Andrew Bee

(57) ABSTRACT

The present invention provides systems and methods for tracking a safety status of a number of individuals, and providing pro-active security and response based on historical safety data collected by the system, as well as third-party information such as crime, traffic, weather, and news data.

8 Claims, 5 Drawing Sheets

SYSTEMS AND METHODS FOR A SAFETY STATUS INDICATOR SYSTEM

CROSS-REFERENCE TO RELATED APPLICATIONS

The present application claims the benefit of co-pending U.S. Non-Provisional patent application Ser. No. 12/862,117, filed on Aug. 24, 2010, which claims the benefit of U.S. Provisional patent application No. 61/236,265, filed on Aug. 24, 2009. The present application further claims the benefit of U.S. Provisional patent application No. 61/610554, filed on Mar. 14, 2012. The contents of each of the aforementioned patent applications are hereby incorporated by reference in their entireties.

BACKGROUND

1. Field of the Invention

The present invention relates generally to the field of safety management, and more specifically, to systems and methods for a safety status indicator system that allows tracking, monitoring, pre-emptive warning, prevention, safe-path generation, and response capabilities, during both emergency and non-emergency scenarios that include pre-incident, incident, and post-incident situations.

2. Description of Related Art

We are constantly reminded of the need for personal safety in today's society. The average person will be a victim of one or more crimes in their lifetimes. Meanwhile, significant constraints exist on the current criminal justice system as well as on private security companies to protect people. It follows that alternatives to traditional 911 emergency system responses would be beneficial.

Traditional individual monitoring and building/location monitoring technologies provide post-incident responses, meaning, attention is brought to response providers after a potential safety issue has occurred. These systems do not use historical data specific to incident scenes, such as the location of prior crimes, in order to warn or pro-actively protect individuals.

Consequently, there is a need for real-time safety tracking of multiple individuals that allows safety providers to follow, notify, assist, and pro-actively warn individuals of safety issues prior to occurrence, as well as address on-going safety issues and provide safe paths that are identified from the collection of such real-time safety information.

SUMMARY

In an embodiment, the invention relates to a method for generating an indicator map, comprising: receiving, at a server, an alarm signal from a first mobile device; receiving, at the server, a stand-by signal from a second mobile device; and generating, by the server, a map displaying a potential incident and an actual incident, where the potential incident is based on the stand-by signal, and the actual incident is based on the alarm signal.

In yet another embodiment, the invention relates to A method of broadcasting security information, comprising: receiving, at a server, a signal including a location identifier from a user mobile device; receiving, at the server, location data corresponding to the location identifier from a remote source; generating, by the server, a security assessment based on the location data and the signal; and transmitting, by the server, the security assessment to a plurality of mobile devices.

In yet another embodiment, the invention relates to a system for tracking and displaying security incidents, comprising: a server; at least one user mobile device communicatively coupled to the server; at least one responder mobile device communicatively coupled to the server; a remote database communicatively coupled to the server; an algorithm stored on the server, the algorithm configured to classify a signal received from the user mobile device as corresponding to a potential incident or an actual incident; and a transmitter coupled to the server, the transmitter configured to broadcast an alarm to the responder mobile device based on the classification of the signal.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
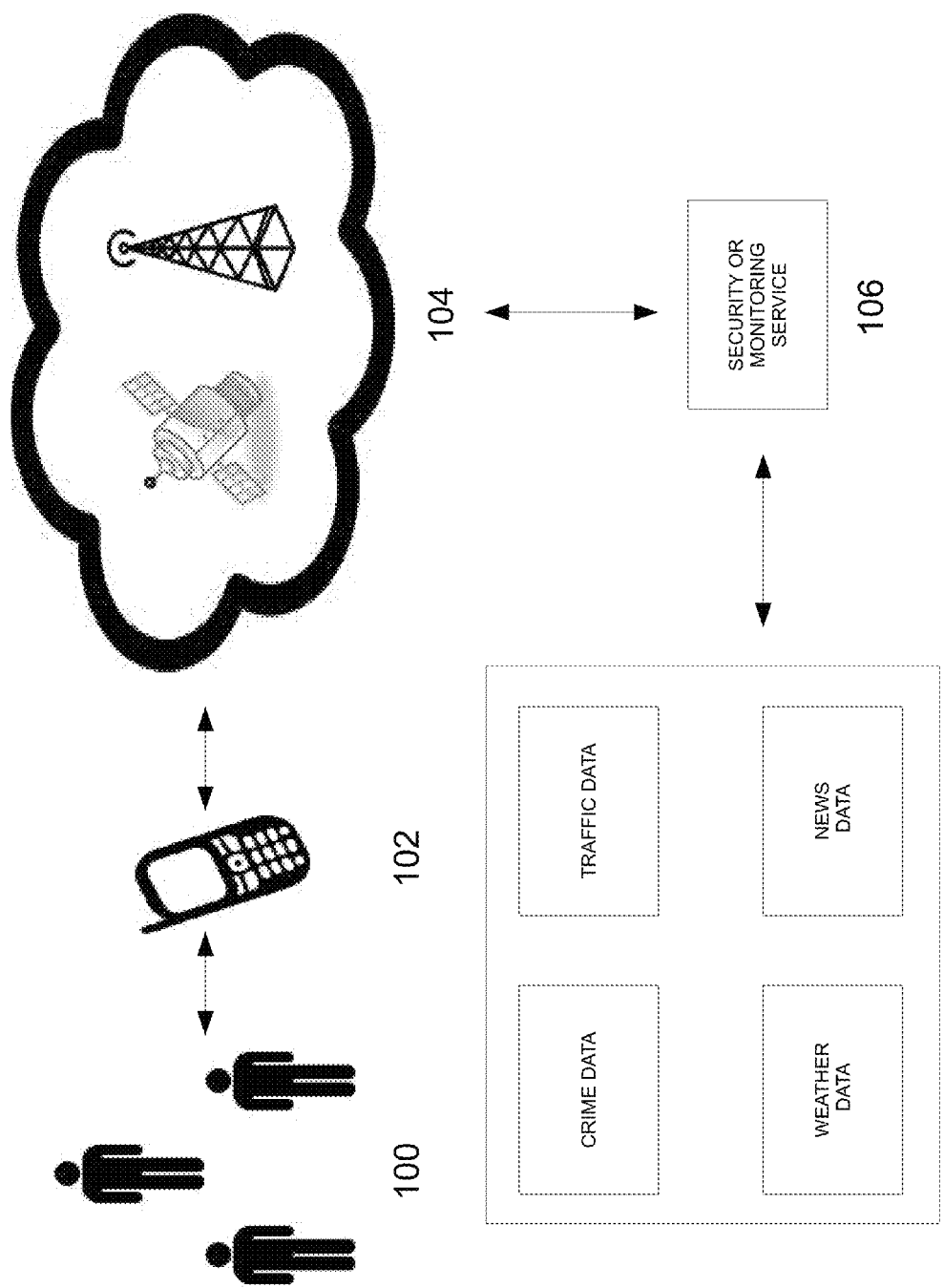
FIG. 1 is a block diagram of a security network in accordance with an embodiment of the present invention.

FIG. 1 is a schematic of a personal safety and tracking system in accordance with an embodiment of the present invention. Referring to FIG. 1, the personal safety and tracking system according to the present invention generally includes personal safety devices (PSDs) 102 which are located on or near the user 100. In a preferred embodiment, users 100 can be a person, such as a child, student, event attendee, elderly person, disabled person, a person living alone, a real estate agent, a mail courier, an undercover law enforcement agent, a postal delivery worker, a teenager, etc., or a group of users thereof, each having their own PSD 102.

For exemplary purposes, a satellite communication system is depicted in FIG. 1. However, any type of communication system which allows for positioning can be used, such as, for example, using multiple cellular phone towers to transmit data and triangulate a user's position. In another embodiment, user devices, such as cellular phones, can be used to triangulate another user's position, as well as transmit data through their mobile network to a remote monitoring center 106.

The communications depicted in FIG. 1 are multi-directional (i.e., two-way, and three-way) communications. That is, the remote monitoring center 106 receives data from the device 102, but can also transmit data to the PSDs 102, as well as to the remote monitoring center 106. In another embodiment, the communications system 104 can transmit the received data to other third-party destinations, such as to first responder and health provider communication systems.

The PSD 102 can be a standalone personal safety device, or can be incorporated into a cellular phone, portable music player, keychain, pager, PDA, or other portable communication device. In another embodiment, the PSD 102 can be worn on the user 100, such as around the user's neck (i.e., necklace or dog collar), ankle (i.e., anklet or ankle bracelet), or as a wristband (i.e., watch strap, watch). In a preferred embodiment, the PSD 102 is a multi-function device that includes signal reception and transmission capabilities, and includes a cellular phone capability that allows the user 100 to communicate with a remote location.

The PSD 102 is configured to transmit an indicator signal to a satellite or global positioning system (GPS) that makes up a communications system 104. The communications system 104 is configured to identify the origination location of the indicator signal transmitted from PSDs 102.

The communications system 104 further provides a means for data and voice communications between the PSD 102 and a remote monitoring center 106. In an embodiment, a communication tower 106 receives an indicator signal from the communications system 104 and routes it to the remote monitoring center 106. In an embodiment, multiple remote monitoring centers 108 are scattered throughout an area, such as a university campus, so that an alarm signal sent from a PSD 102 is routed to the remote monitoring center 106 located in the closest proximity to the users 100.

The remote monitoring center 106 is powered by an intelligent security assessment algorithm that synthesizes various data inputs to provide a security assessment of a user, environment, or situation. The security assessment algorithm, named the Victor Algorithm, utilizes data from the user and user device, such as location coordinates, path and speed of travel, past movement history and patterns, temperature and sounds (i.e. irregular noises) from the user's surroundings, and images and video of the user's surroundings. Furthermore, the Algorithm utilizes third-party data 108 such as crime statistics, traffic patterns (vehicle, aircraft, and human), crime cycles, weather patterns, gang-activity, live news feed, police radio channel monitoring, etc. The Algorithm also utilizes in-house data such as user routines and behaviors, vulnerability of people and assets, and data from other users of the security network collected over time. All of this information is correlated to obtain a security assessment for a geographic area where users 100 are currently travelling, have travelled to, or may travel to in the future.

Figure 2:
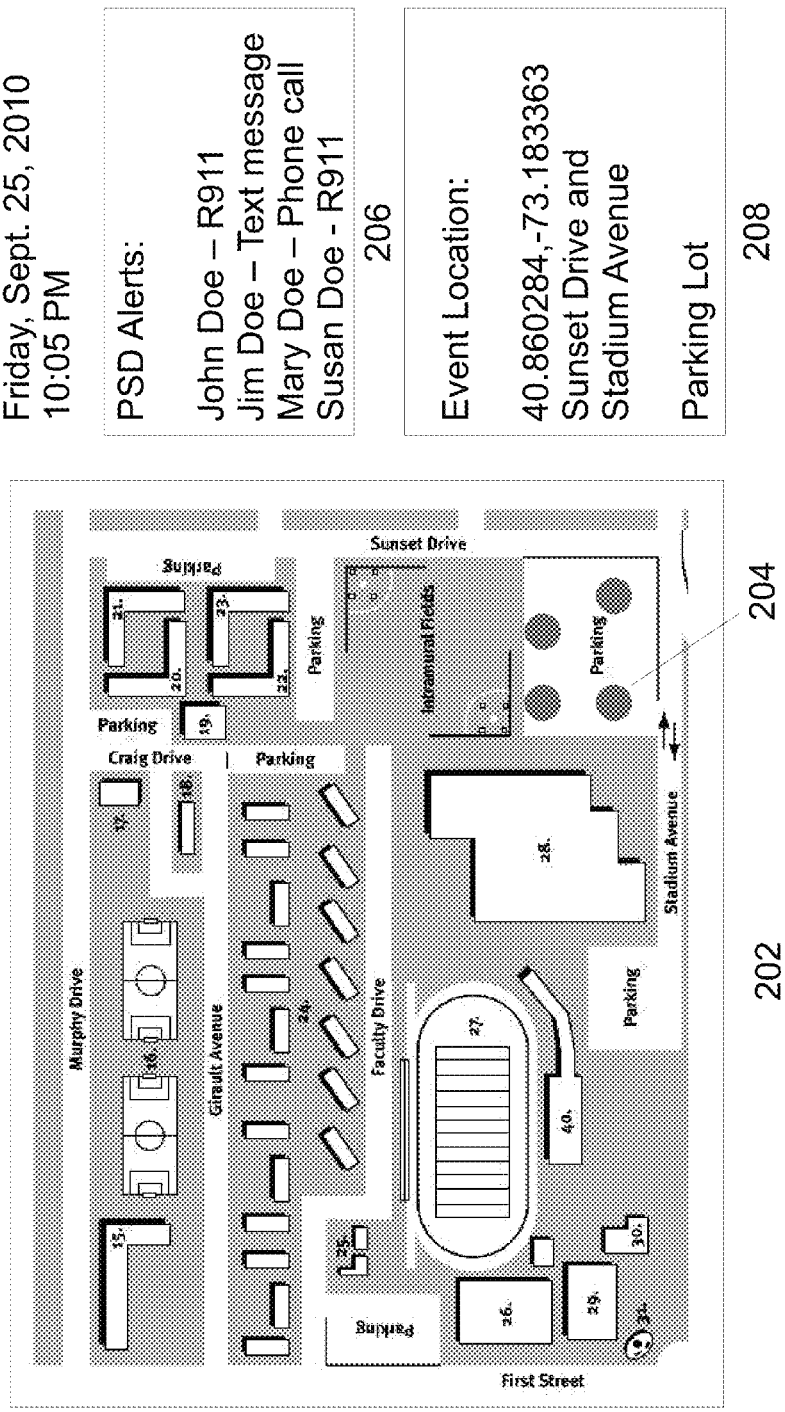
FIG. 2 is an illustration of an exemplary dispatch interface in accordance to certain embodiments of the invention.

FIG. 2 is an illustration of an exemplary dispatch interface in accordance to certain embodiments of the invention. The dispatch interface 200 visually depicts on a map 202 locations where users 100 have transmitted indicator signals. The locations are shown as indicators 204 on the map 202. For example, if a user 100 is walking through a campus parking lot, and feels uneasy, the user can activate an indicator signal using the R-911 feature on their PSD 102. The indicator signal will be sent to the remote monitoring center 106, and the R-911 indicator will be shown on the dispatch interface.

The R-911 features discussed herein are described in more detail in co-pending U.S. non-provisional patent application Ser. No. 13/454,230, filed on Apr. 24, 2012, entitled, "Systems and methods for initiating a stand-by signal and a distress signal from a mobile device", the contents of which is hereby incorporated by reference in its entirety.

Multiple users 100 can transmit indicator signals to the remote monitoring center 106 using a variety of methods, including, but not limited to, R-911, text, SMS, phone call, email, social network posting, instant message, picture message, video message, or any other type of electronic communication means. The notification section 206 displays users 100 that have sent indication signals to the remote monitoring center 106. For example, in an exemplary embodiment, the name of the user and their means of signal transmission are displayed.

In another embodiment, the notification section 206 can display the actual message sent by users, such as a text message, email, SMS, social networking post, photograph, video, etc. The dispatch interface 200 can also be coupled to a speaker so that a phone call or live audio and/or video can be heard through the system in real-time.

The dispatch interface 200 can further includes a text display that transcribes the communication between any users 100 and the dispatch operator. This text is stored in a database along with the audio/video recording as described above and can be retrieved for later review and analysis.

The dispatch interface 200 can also include a location section 208, which displays an address, latitude and longitude coordinates, landmarks, cross streets, intersection or other location identifying information based on the location of the PSDs 102.

The dispatch interface 200 can also include a data feed section 210, which displays various information related to indicators 204. For example, information about the location near the indicators 204 can be displayed, such as street/overhead/building lighting information, or that suspicious activity has been reported in the area recently. The data feed section 210 is populated by third-party and in-house databases, such as those providing crime statistics, traffic patterns (vehicle, aircraft, and human), crime cycles, weather patterns, gang-activity, live news feed, police radio channel monitoring, etc.

The map 202 displays locations of users 100 that have transmitted indicator signals to the remote monitoring center 106. The map 202 can be a static map, or a map similar to Google Maps that provides satellite imagery as well as static images for roadways and buildings. The map 202 can include "pin drop" functionality, so that an operator can select a point on the map, such as an area where multiple indicators 204, and can see a live video feed of the location via video and/or surveillance cameras located near the location. For example, in a campus setting, the system can access video camera feeds of cameras located throughout the campus.

In another embodiment, the indicators 204 can be color-coded, where based on the type of indicator signal received from the PSD 102, the indicator 204 can display an appropriate color-coded safety level. For example, if a R-911 alert signal is sent, the indicator can be coded orange or yellow to indicate caution. If a R-911 distress signal is sent, the indicator can be coded red or be flashing to indicate that urgent attention is required.

Similarly, the indicator can be color-coded automatically based on the contents of emails, text messages, social networking posts, or phone calls, where the system transcribed the text and identifies key descriptors such as "danger", "help", "attack", "rape", "fight", "gun", "drugs", etc., and color codes the indicator appropriately.

Figure 3:
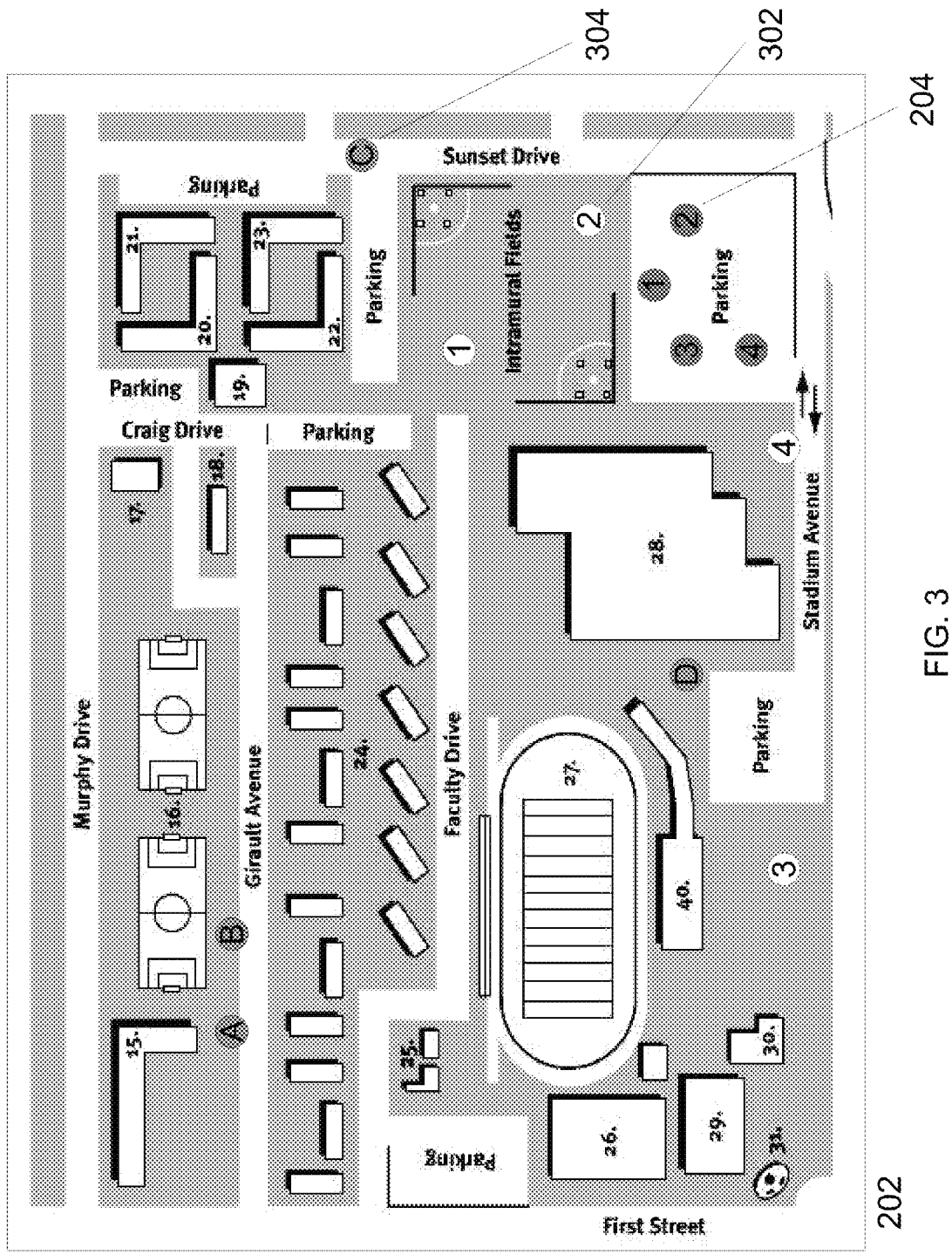
FIG. 3 is an illustration of an exemplary map interface in accordance to certain embodiments of the invention.

FIG. 3 is an illustration of an exemplary map interface in accordance to certain embodiments of the invention. In an embodiment, once a user 100 transmits an indicator signal to the remote monitoring center 106, the map 202 displays color-coded indicators 204 1-4 that visually denote the location of a possible safety issue. Indicators 302 1-4 shows the current location of the user. For example, if user 1 transmits an indicator signal, then indicator 204-1 will show the location where the signal originated. The map 202 also displays user 1's current position as shown by indicator 302-1. The current position of users who transmit indicator signals can assist operators in determining where users are dispersing to, to identify safe routes, and where to direct response teams to.

In an embodiment, indicators 304 A-D indicate the location of response providers, such as safety patrol, campus police, fire and rescue squads, and other individuals or groups that have opted-in to a Spartan Network. The dispatch operator can identify nearby response providers that can then be routed to the location of an incident, to roadways to direct traffic in avoidance of the location, and/or to users directly 100.

Figure 4:
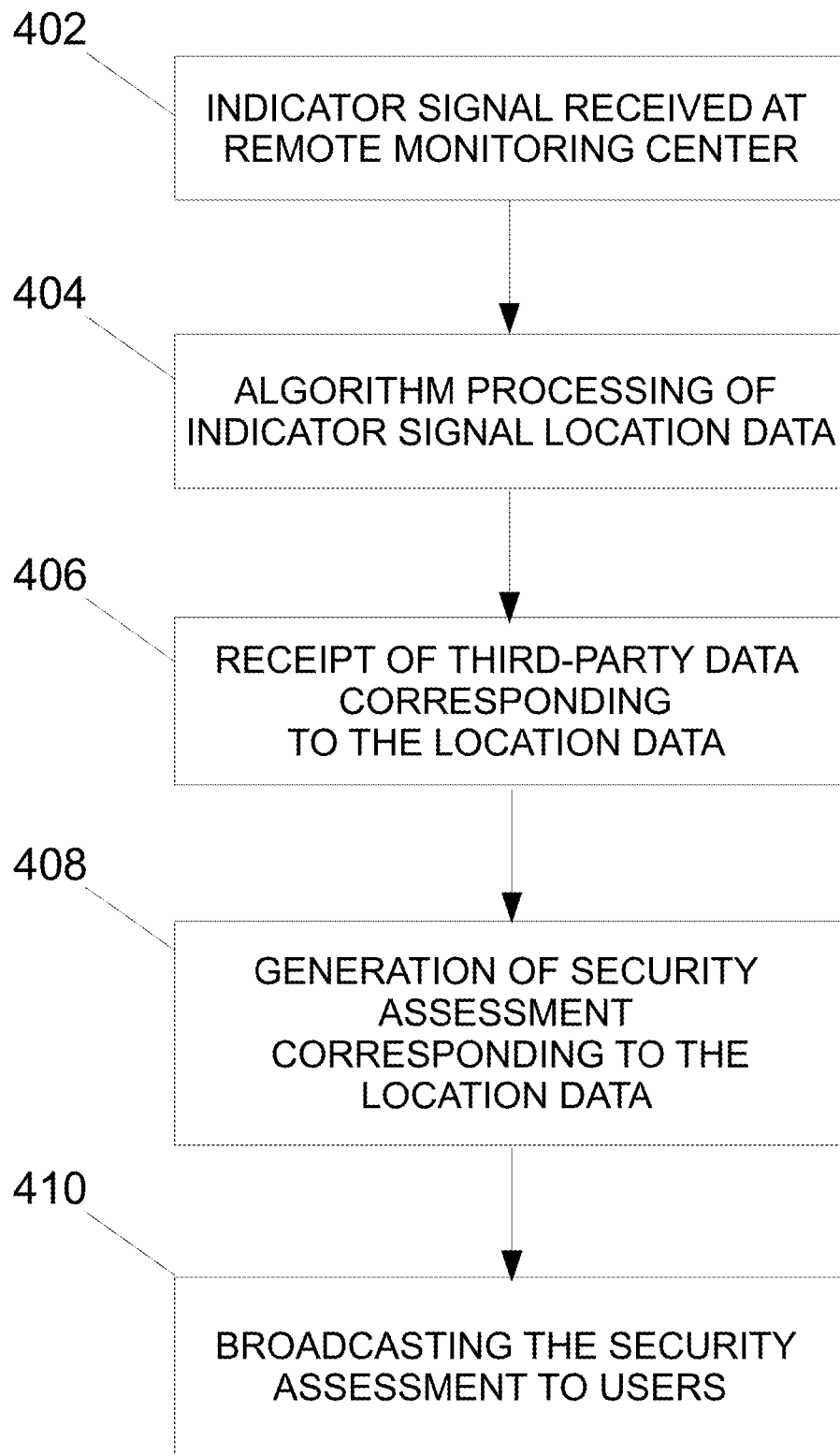
FIG. 4 is a flow chart of processing indicator signals according to an exemplary embodiment of this invention.

FIG. 4 is a flow chart of processing indicator signals according to an exemplary embodiment of this invention. In step 402, indicator signals are received from PSDs. In an example, students on a campus can download a software application for their PSD (i.e., smartphone, Blackberry, iPhone, tablet, Android, notebook computer, etc.). The software application can allow users 100 to transmit an indicator signal from their PSD to the remote monitoring center 106. In another embodiment, the PSD can include a hardware-based button or switch to trigger an indicator signal.

In step 404, the Algorithm, which can be stored locally on a computing device at the remote monitoring center, or remotely on a remote server, extracts data from the indicator signal. The indicator signal can include, in an exemplary embodiment, information related to PSD identification, location information, physiological information about the user, environment information related to the user's surroundings, and multimedia data. The Algorithm extracts, among other data, the location information from the indicator signal, and places an indicator 204 on the map 202 on the dispatch interface 200.

In step 406, the Algorithm requests information from third-party data sources that correspond to the location information, such as databases that provide real-time and historical information on crime, traffic, weather, gang-activity, news reports, and police radio channel transcriptions. For example, if user's transmit multiple indicator signals from a dormitory lounge, the Algorithm can obtain police reports filed by residents of that particular dormitory, pedestrian and vehicle traffic information on the roads adjacent to the dormitory, maintenance records related to the dormitory from the campus housing authority, etc.

In step 408, based on an analysis of the third-party data, and the indicator signals 204, the Algorithm generates a security assessment of the location. The security assessment can be used to notify appropriate response providers, to alert dormitory residents to avoid the lounge until further notice, to close and/or lock the dormitory lounge doors, to activate fire sprinklers and/or alarms, etc.

In step 410, the remote monitoring center 108 can broadcast the security assessment in real-time, as mentioned above, to dormitory residents or students and faculty on campus. In addition, if future indicator signals are generated from the dormitory lounge on another date or time, the current security data is accessed so that the Algorithm can learn about specific responses and alerts previously generated to determine what actions are effective.

In an embodiment, cumulative indicator signal data over time can be used to pre-emptively anticipate and predict possible security issues. For example, if after every home basketball game, multiple indicator signals are received from an alleyway behind the basketball stadium, this would indicate additional security staff be dispatched to the alleyway during basketball games.

Similarly, if multiple indicator signals from certain areas of campus, such as walkways, parking lots, or remote buildings are routinely received, this would indicate that students do not feel safe or perceive danger in these parts of campus. Such information is extremely difficult to obtain by campus safety officials unless a survey is taken amongst the student body. However, the present invention automatically collects and analyzes indicator data to pro-actively identify areas of campus where security should be addressed. This can include the installation of emergency response call boxes, additional lighting, or even physical security officer presence.

Figure 5:
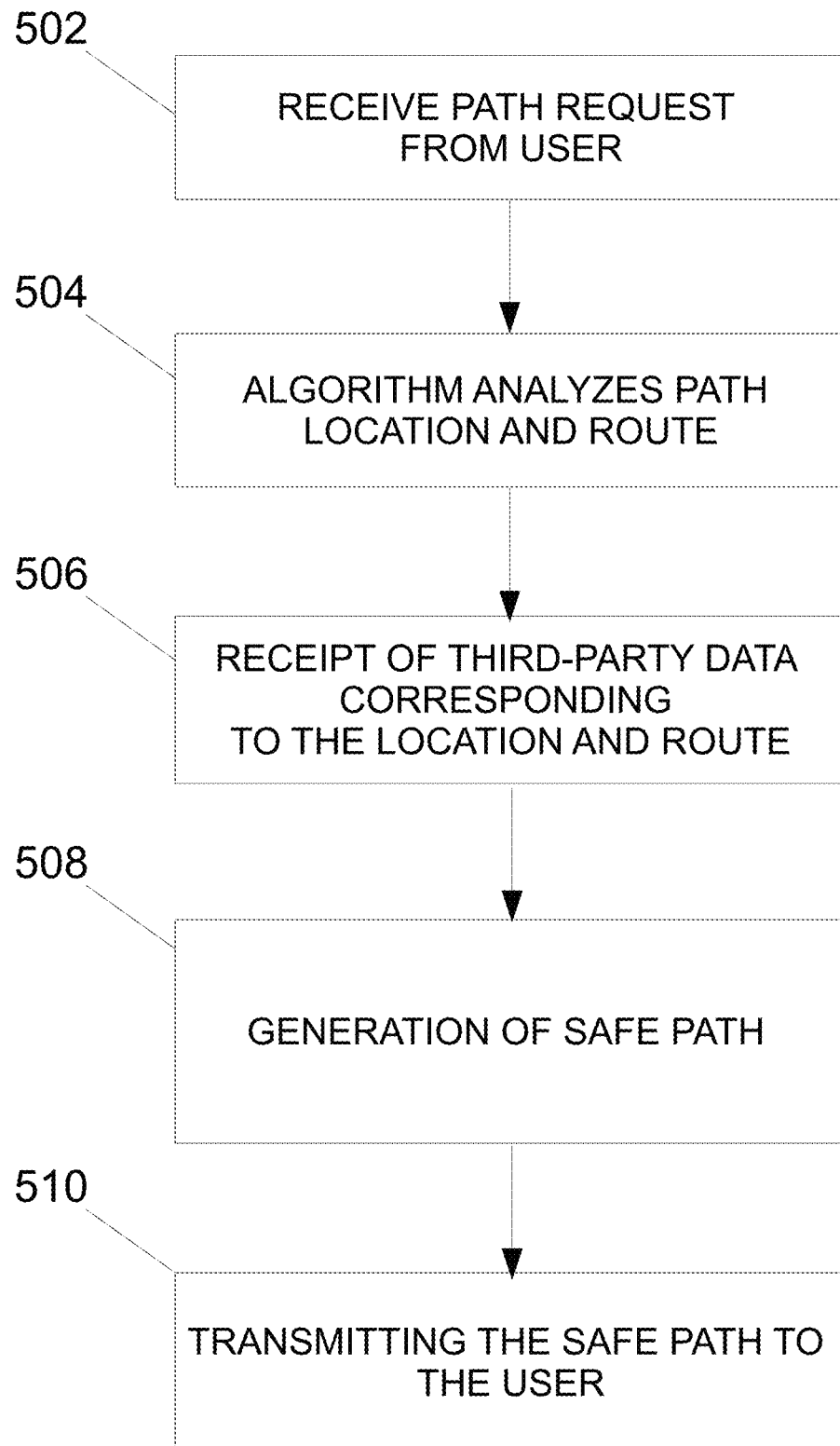
FIG. 5 is a flow chart of processing indicator signals for safe path generation according to an exemplary embodiment of this invention.

FIG. 5 is a flow chart of processing indicator signals for safe path generation according to an exemplary embodiment of this invention. The present invention may be used to provide a safe path or route for a user. In step 502, the user 100 enters a destination or end point on their PSD 102. The PSD 102 transmits the destination information to the remote monitoring center 106. The user 100 can manually enter the destination information, or verbally speak it into their PSD 102. In addition, the user's current location can automatically be determined by software on the PSD 102, or by the remote monitoring center 106.

In step 504, the Algorithm analyzes multiple routes that the user 100 can take from their current location to their requested destination.

In step 506, the Algorithm requests information from third-party data sources that correspond to the various routes, such as databases that provide real-time and historical information on crime, traffic, weather, gang-activity, news reports, and police radio channel transcriptions. For example, if one of the possible routes includes walking across a campus parking lot, the Algorithm receives information regarding the lighting on the parking lot, the current number of other PSDs (and thus users) in or near the parking lot, any indicator signals transmitted from the parking lot, campus security and police reports regarding recent incidents near the parking lot, etc.

Based on the analysis of the third-party information, as well as information from other PSDs, the Algorithm identifies and transmits safest path for the user 100 to take in step 510. If multiple paths are equally safe, the Algorithm automatically selects the shortest path for the user. If no paths are deemed safe, the Algorithm can dispatch responders to escort the user 100 to their destination, or connect the user to a transportation service, such as a taxicab or bus.

If a path is not deemed dangerous, but also not particularly safe, the remote monitoring center 106 can transmit known safety issues to the user 100 about the route. For example, if a mugging was reported along the route during the previous month, the user 100 can be informed so that they can take extra caution during their trip.

While the principles of the disclosure have been illustrated in relation to the exemplary embodiments shown herein, the principles of the disclosure are not limited thereto and include any modification, variation or permutation thereof.

What is claimed is:
1. A method for generating an indicator map, comprising:
receiving, at a server, an alarm signal from a first mobile device;
receiving, at the server, a stand-by signal from a second mobile device;
receiving, at the server, a responder signal from a responder mobile device;
generating, by the server, a map displaying a location of a potential incident, a location of an actual incident, and a location of the responder mobile device, where the potential incident is based on the stand-by signal, and the actual incident is based on the alarm signal;

displaying the map on a display, by the server;

displaying, by the server, additional information related to the locations, where the additional information is shown adjacent to the map on the display, wherein the additional information consists of a police report, a maintenance record, and weather data; and generating, by the server, a suggested security improvement, based on the alarm signal, the stand-by signal, and the additional information.

2. The method of claim 1, wherein the potential incident and the actual incident are displayed on the map using different colors or shapes.

3. The method of claim 1, further comprising generating an alarm, by the server, upon receipt of multiple stand-by signals from a plurality of mobile devices within a threshold distance of one another.

4. The method of claim 1, wherein the additional information further consists of police radio channel transcriptions.

5. The method of claim 4, wherein the suggested security improvement is selected from a group comprising an installation of emergency response call boxes, installation of additional lighting, deployment of security officers.

6. The method of claim 1, further comprising, transmitting, from the server, an alarm to a responder mobile device upon receipt of either the alarm signal or the stand-by signal by the server.

7. The method of claim 1, further comprising, transmitting, from the server, an alarm to a responder mobile device upon receipt of multiple stand-by signals from a plurality of mobile devices.

8. The method of claim 1, further comprising, transmitting, from the server, an alarm to a plurality of mobile devices upon receipt of the alarm signal or the stand-by signal.

* * * * *